(12) United States Patent  (10) Patent No.: US 6,243,444 B1
O'Neal  (45) Date of Patent: Jun. 5, 2001

(54) APPARATUS AND METHOD FOR LOCAL INTERCEPT AND SERVICE OF LONG-DISTANCE CALLS

(75) Inventor: Stephen C. O'Neal, San Francisco, CA (US)

(73) Assignee: International ThinkLink Corporation, San Francisco, CA (US)

( * ) Notice: Subject to any disclaimer, the term of this patent is extended or adjusted under 35 U.S.C. 154(b) by 0 days.

(21) Appl. No.: 09/288,754

(22) Filed: Apr. 8, 1999

(51) Int. Cl.$^7$ .................................................. H04M 3/533
(52) U.S. Cl. ..................................... 379/88.17; 379/88.22; 379/115; 379/213
(58) Field of Search ................................ 379/67.1, 70, 74, 379/84, 88.12, 88.17, 88.22, 88.23, 88.25, 88.26, 93.01, 93.24, 111, 112, 113, 114, 115, 201, 213, 210, 207, 219

(56) References Cited

U.S. PATENT DOCUMENTS

| 5,381,465 | * | 1/1995 | Carter et al. | 379/67 |
| 5,535,264 | * | 7/1996 | Starr et al. | 379/89 |
| 5,646,982 | * | 7/1997 | Hogan et al. | 379/89 |
| 5,751,794 | * | 5/1998 | Kugell et al. | 379/89 |
| 5,864,606 | * | 1/1999 | Hanson et al. | 379/88.18 |
| 5,883,891 | * | 3/1999 | Williams et al. | 379/90.01 X |
| 5,963,618 | * | 10/1999 | Porter et al. | 379/88.17 |
| 5,982,858 | * | 11/1999 | Carter et al. | 379/88.26 |

* cited by examiner

Primary Examiner—Scott L. Weaver
(74) Attorney, Agent, or Firm—Richard K. Huffman; James W. Huffman (57) ABSTRACT

An apparatus and method are provided for locally intercepting and servicing a long-distance call, prior to incurring charges associated with routing of the long-distance call over a corresponding long-distance carrier channel. A caller is immediately given the option to send a voicemail message to a recipient rather than completing the long-distance call. If the caller so chooses, the voicemail is recorded locally, the call is terminated, and the voicemail message is subsequently transmitted to the recipient via a data-centric network. The apparatus includes a telephony-centric network server and a message router. The telephony-centric network server detects initiation of the long-distance call, it intercepts the long-distance call, and it transmits the voicemail message over the data-centric network. The message router is coupled to the telephony-centric network server. The message router forwards the voicemail message over the data-centric network to a recipient. The voicemail message is delivered to the recipient from a corresponding local telephone switch.

32 Claims, 7 Drawing Sheets

*Customer Notification Calls - Example Long-Distance Cost and Touch Labor*

| Call | Number | Redials | Duration (min) | Cost |
|---|---|---|---|---|
| 1 | 202.555.1212 | 0 | 1 | .10 |
| 2 | 156.555.1213 | 4 | 2 | .20 |
| 3 | 453.555.1214 | 0 | 1 | .10 |
| 4 | 908.555.1215 | 1 | 1 | .10 |
| 5 | 837.555-1216 | 0 | 3 | .10 |
| TOTAL | | | | $0.60 | redial touch labor due to busy circuits

FIG. 4

*Local Intercept and Service of Long-Distance Calls*

APPARATUS AND METHOD FOR LOCAL INTERCEPT AND SERVICE OF LONG-DISTANCE CALLS

CROSS-REFERENCE TO RELATED APPLICATIONS

This application is related to the following co-pending U.S. Patent Applications that are hereby incorporated by reference:

| Application No. | Filing Date | Title |
| --- | --- | --- |
| Docket ITC:9901 | 1/29/99 | INTEGRATED MESSAGE STORAGE AND RETRIEVAL SYSTEM DISTRIBUTED OVER A LARGE GEOGRAPHICAL AREA |
| Docket ITC:9902 | 1/29/99 | A SYSTEM AND METHOD FOR PROVIDING UNIFIED MESSAGING TO A USER WITH A THIN WEB BROWSER |
| Docket ITC:9903 | 1/29/99 | CENTRALIZED COMMUNICATION CONTROL CENTER AND METHODS THEREFOR |
| Docket ITC:9904 | 1/29/99 | COMPUTER-IMPLEMENTED CALL FORWARDING OPTIONS AND METHODS THEREFOR IN A UNIFIED MESSAGING SYSTEM |
| Docket ITC:9905 | 1/29/99 | INTERACTIVE BILLING SYSTEM UTILIZING A THIN WEB CLIENT INTERFACE |
| Docket ITC:9906 | 1/29/99 | A SYSTEM AND METHOD TO MANAGE PHONE SOURCED MESSAGES |
| Docket ITC:9907 | 1/29/99 | METHOD AND APPARATUS FOR NETWORK INDEPENDENT INITIATION OF TELEPHONY |
| Docket ITC:9908 | 1/29/99 | APPARATUS AND METHOD FOR DEVICE INDEPENDENT MESSAGING NOTIFICATION |
| Docket ITC:9909 | 1/29/99 | APPARATUS AND METHOD FOR CHANNEL-TRANSPARANT MULTIMEDIA BROADCAST MESSAGING |
| Docket ITC:9910 | 1/29/99 | VOICE ACCESS THROUGH A DATA-CENTRIC NETWORK TO AN INTEGRATED MESSAGE STORAGE AND RETRIEVAL SYSTEM |

DEFINITION OF TERMS

Data-centric network: a network that carries digital data, primarily to facilitate information exchange among computers and computer peripherals. Examples include distributed computer networks such as the Internet.

Telephony-centric network: a network that carries telephony information such as voice, fax, page messages, and the like, primarily to facilitate information exchange among telephony devices.

Message: a communication which may be transmitted via either the data-centric network or the telephony-centric network. Examples include voicemail, electronic mail (email), facsimile (fax), page, and the like.

Telecommunication device: POTS telephone, cellular telephone, satellite telephone, web telephone, PC (desktop and laptop), web surfer, personal digital assistant (PDAs), facsimile machine, teletype, modem, video telephone, set top telephone.

Web telephone: a telephone implemented via a computer that is coupled to the data-centric network. An example is a PC with microphone, speaker and internet connection.

Set top telephone: a telephone set coupled to a cable-based set top box, bypassing the local telco provider. The cable-based system may be provided by, for example, WebTV, TCI cablevision.

Web surfer: an Internet-ready PC with a network connection and pre-installed web browser.

PDA: personal digital assistant, e.g., Palm Pilot available from 3COM.

Thin Web Client: A commonly employed web browser such as Internet Explorer or Netscape Navigator—JAVA enabled.

PSTN: Public Service Telephony-centric network, e.g., AT&T, MCI, Sprint-owned telco.

GUI: graphic user interface

POTS: plain old telephone service

NOC: Network Operations Center

POP: point of presence, e.g., co-location at a local telco switch or at a company controlled area with T1 connections to a local switch.

WPOP: Web POP

VPOP: Voice POP

BACKGROUND OF THE INVENTION

1. Field of the Invention

This invention relates in general to the field of telephony, and more particularly to an apparatus and method for locally intercepting a long-distance call and providing a caller the option to leave a voicemail message rather than placing the long-distance call.

2. Description of the Related Art

The invention of the telephone at the turn of the century presented a new form of communication to the population at large. Whereas prior messages were delivered directly to a message recipient either by mail, telegraph, or personal courier, telephones introduced a new option for delivering a message. More urgent matters were treated immediately with a telephone call while less important matters were relegated to the mail.

Technological advances in the field of telephony have only served to intensify the sense of immediacy that so profoundly dictates the business models in use today. The provision of affordable long-distance services in particular has resulted in the creation of entire departments within certain businesses consisting exclusively of customer service representatives whose sole responsibility is to contact customers and notify them of facts related to order status, reservation confirmation, solicitation needs, and like information. Whereas businesses in former times relegated such notification tasks to the mail, today's businesses can profit by more immediately initiating customer notifications.

Deregulation within the communications industry has contributed extensively to the affordability of telecommunications services. In most parts of the United States today, a consumer is allowed to choose from hundreds of long-distance carriers for routing of his/her long-distance calls to their intended destinations. It is common practice today for a consumer to specify a particular long-distance carrier who will by default be used to route the consumer's long-distance calls. This specification is known as direct provisioning. But a caller can also override direct provisioning to select another long-distance carrier to route a specific call or group of calls. Routing logic within a local telephone switch distributes long-distance calls to specified carrier equipment based upon this direct provisioning or upon overriding commands provided by a caller.

Competition within the long-distance carrier industry is so intense that consumers and businesses today routinely treat long-distance service as a commodity item-an item where price is the driving consideration when selecting a service provider. And this commodity mindset has crept into the manner in which businesses interact with their customers.

For example, in businesses that have a number of notifications to provide to customers, operators are dedicated to providing such notifications via telephone. A given operator may make hundreds of calls each workday, essentially to have hundreds of one-way conversations like, "Hello Mr. Smith. Your order, number 123456, that you placed on February 22, has just been shipped."

In addition to repeatedly having to say the same phrases though, operators experience inefficiencies by being forced to redial telephone numbers that are busy. Yet a considerable problem that is generally accepted in the industry is that each long-distance call placed to a customer incurs a corresponding long-distance charge. That each call accrues charges is significant for two reasons. First, the cost of each call, although most likely costing less than 25 cents for most calls within the United States, becomes noteworthy when viewed from the standpoint of 1,000 calls a day. But the more remarkable aspect of such business practices is that these businesses utilize a two-way communication medium to provide for one-way delivery of a message-the message recipient is not required to respond to the message! The implication of this fact is that a recipient can be notified without the requirement that an operator be present during the notification. One skilled in the art will appreciate that a technique that allows messages to be transmitted via telephone without incurring long-distance charges is highly desirable. Furthermore, one skilled in the art will acknowledge that operator efficiency will improve if a technique for notifying customers is provided that does not require an operator to be present during transmission of a message.

Therefore, what is needed is a method that allows a long-distance caller to avoid the unnecessary charges associated transmitting an audio message to a recipient.

In addition, what is needed is an apparatus that provides the option for a caller to send a voicemail rather than placing a long-distance call prior to incurring long-distance-free carrier charges associated with placing the call.

Furthermore, what is needed is a long-distance call intercept and service mechanism that captures long-distance calls at a local switch prior to placing the calls over a long-distance carrier.

SUMMARY

To address the above-detailed deficiencies, it is a feature of the present invention to provide an apparatus and method for intercepting a long-distance call that allows a caller to send a voicemail in lieu of the call, prior to incurring any long-distance charges.

Accordingly, the present invention provides a method for locally intercepting a long-distance call. The method includes accessing a first telephony-centric network server; initiating the long-distance call; prior to completing the long-distance call, allowing a caller to prescribe a voicemail message; routing the voicemail message over a data network, the data network employing a packet-switched communications protocol, to a second telephony-centric network server that corresponds to a recipient of the long-distance call; and delivering the voicemail message to the recipient rather than completing the long-distance call.

A benefit of the present invention is that long-distance charges associated with notification calls are avoided.

In another aspect, the present invention provides an apparatus for locally intercepting a long-distance call for the purpose of allowing a caller to prescribe a voicemail message rather than completing the long-distance call. The apparatus has a telephony-centric network server and a message router. The telephony-centric network server detects initiation of the long-distance call, it intercepts the long-distance call prior to transmission over a telephony-centric network, and it transmits the voicemail message over a data-centric network, the data-centric network providing for packet-switched communications. The message router is coupled to the telephony-centric network server. The message router forwards the voicemail message over the data-centric network to a recipient, where the voicemail message is delivered to the recipient from a corresponding local telephone switch.

Another benefit of the present invention is that notification operators are not encumbered with unnecessary redials for busy telephones.

In a further aspect, the present invention provides a long-distance call interception apparatus. The apparatus includes a telephony-centric network server and a message router. The telephony-centric network server locally intercepts and services a long-distance call. The telephony-centric network sever comprising has call intercept logic and a call controller. The call intercept logic allows a caller to prescribe a voicemail message in lieu of completing the long-distance call over a telephony-centric network. The call controller is coupled to the call intercept logic. The call controller translates the voicemail message into data packets, and transmits the data packets over a data-centric network rather than the telephony-centric network. The message router is coupled to the telephony-centric network server. The message router receives the data packets and routes the data packets over the data-centric network such that a receiving local telephone switch is caused to deliver the voicemail message to a receiving device.

A further benefit of the present invention is that long-distance carrier circuits traffic is reduced due to the more efficient transmission of recorded voicemail messages.

In yet another aspect, the present invention provides an apparatus for locally servicing a long-distance call, the long-distance call being initiated from a calling device that has accessed a telephony-centric network server. The apparatus has call intercept logic, voicemail storage elements, a call controller, and a data-centric network. The call intercept logic allows a caller to generate a voicemail message over the calling device for delivery to a receiving device, where the voicemail message is generated and delivered instead of completing the long-distance call over a telephony-centric network. The voicemail storage elements are coupled to said the call intercept logic. The voicemail storage elements temporarily store the voicemail message along with a telephone number corresponding to the receiving device. The call controller is coupled to the voicemail storage elements. The call controller retrieves the voicemail message and translates the voicemail message into data packets. The data-centric network is coupled to the call controller. The data-centric network transmits the data packets such that the voicemail message is delivered to the receiving device by a local telephone switch, where the data-centric network provides for packet-switched communications, and where the data-centric network is employed in lieu of the telephony-centric network for delivery of the voicemail message.

Yet another benefit of the present invention is that businesses making large numbers of notification calls experience significant long-distance savings.

BRIEF DESCRIPTION OF THE DRAWINGS

These and other objects, features, and advantages of the present invention will become better understood with regard to the following description, and accompanying drawings where.

DETAILED DESCRIPTION

In light of the above background on long-distance call handling techniques, several related art examples will now be discussed with reference to FIGS. 1 through 3. These examples illustrate how callers incur unnecessary long-distance costs each time they place a long-distance call simply to deliver a message that does not require immediate feedback from a recipient. For businesses that make many calls of this sort, such costs represent a significant overhead expense. Following this discussion, a detailed description of the present invention will be provided with reference to FIGS. 4 through 7. The present invention provides the capability to intercept a long-distance call at its local origination point, prior to incurring long-distance carrier charges. A caller is then given the option to record a voicemail message for a recipient in lieu of completing the long-distance call. Once recorded, the voicemail is automatically delivered to the recipient over a data-centric network.

Figure 1:
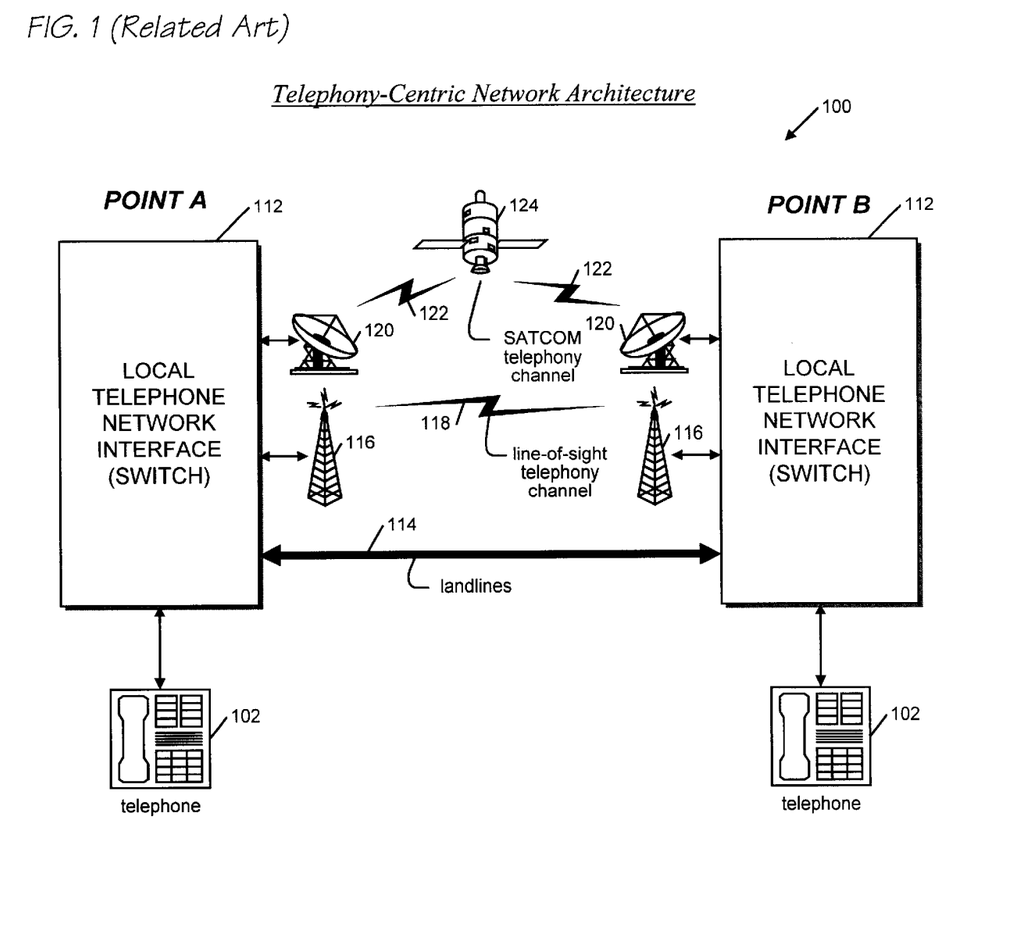
FIG. 1 is a block diagram illustrating the architecture of a related art telephony-centric network.

Referring to FIG. 1, a block diagram 100 is presented illustrating the architecture of a related art telephony-centric network. The block diagram 100 shows two local telephone network interfaces 112, one at POINT A and another at POINT B. The telephone network interface 112 is also referred to as a local switch 112. The block diagram 100 additionally depicts two telephones 102 connected to the local telephone network interfaces 112. The block diagram 100 shows three types of channels for transmitting telecommunication signals: a hardwired channel 114, a radio frequency (RF) line-of-sight (LOS) channel 118, and a satellite communications (SATCOM) channel 122.

In operation, each of the telephones 102 are provided with a corresponding telephone number, so that they may be readily accessed by the local telephone network interface 112 for call transmission and receipt. The local switch 112 is the point where local telecommunication devices 102 interface to the telephony-centric network communication channels 114, 118, 122. A transmitting local device 102 at POINT A places a call to a compatible receiving device 102 at POINT B by providing a telephone number assigned for the receiving device 102 at POINT B to the local switch 112 at POINT A. The local switch 112 at POINT A then routes the call to the local switch 112 at POINT B via the hardwired channel 114, the RF LOS channel 118, the SATCOM channel 122, or a combination thereof. The local switch 112 at POINT B provides final routing of the call to the receiving device 102. For a given call, routing logic (not shown) within the local switch 112 at POINT A determines which telephony channel 114, 118, 122 or combination of channels 114, 118, 122 to use for the transmission. This determination is based upon a number of factors to include the geographic separation of POINT A and POINT B, the availability of a channel 114, 118, 122 at the time the given message is transmitted, and any preferences that are specified by a caller. For example, a call from San Francisco to San Jose, because the two points are only a few miles apart, is most likely transmitted over the hardwired, or landline, channel 114. This channel 114 modulates electrical signals over wires or fiber-optic cables to communicate the call between San Francisco and San Jose. A second call from San Francisco to Los Angeles, because the two points are separated by hundreds of miles, may be transmitted over the RF LOS channel 118. This channel type translates electrical signals provided by the local switch 112 in San Francisco to RF signals and transmits the second call between a number of RF LOS antennas 116 for delivery to Los Angeles. The RF signals are then translated back to electrical signals compatible with receiving devices in Los Angeles. A third call from San Francisco to Paris, because the two points are separated by thousands of miles, may be transmitted over the SATCOM channel 122. This channel translates electrical signals provided by the local switch 112 in San Francisco to RF signals and transmits the third call between a transmitting satellite antenna 120 to a satellite 124 above the Earth. The satellite 124 relays the third call to a receiving satellite antenna 120 near Paris. The RF signals are then translated back to electrical signals compatible with receiving devices in Los Angeles. One skilled in the art will appreciate that many factors influence the channel medium 114, 118, 122 chosen for transmission of a given call over the telephony-centric network and that the choice of medium 114, 118, 122 is transparent to both the call originator and the call recipient. A call between San Francisco and Paris could just as well be transmitted by landlines 114 as by a satellite 124—what the originator and recipient hear is words spoken over a telephone 102. Although FIG. 1 depicts telephones 102 connected to the local switches 112, one skilled in the art will appreciate that various other devices may be used to place calls of differing types over the telephony-centric network. These devices include computers equipped with telecommunications apparatus, facsimile machines, cellular telephones, and the like.

Regardless of the channel 114, 118, 122 provided for transmission of a message, it is important to note that the local switch 112 is the point of interface to the telephony-centric network and that each telephone 102 connected to the network is accessed, or addressed, by a unique telephone number. To be accessed, that is, to place and receive calls, a device 102 must be connected to the telephony-centric network and must have an assigned telephone number. Use of the telephone number is the only way to address the telephone 102. Moreover, a telephone 102 connected to the telephony-centric network may not be accessed via any other network except through a corresponding local switch 112.

As is FIG. 1 shows, there are different types of channels 114, 118, 122 for delivering telecommunications signals between local switches 112. Up through the early 1980's, all of the assets in the United States associated with the telephony-centric network were managed by a single business entity. However, deregulation of telecommunications during the 1980's has allowed numerous service providers to compete for different aspects of the telecommunications business. For example, the government presently allows a local telephone company to exclusively provide local services within a specified geographic area, known as a local exchange. The local telephone company is also called a local exchange carrier. Typically, calls that are placed within the local exchange are serviced by the local exchange carrier and are called local calls. Calls that are placed between two local exchanges are known as interexchange calls, or long-distance calls. Long-distance, or long-haul, carriers provide for transmission of telecommunications signals between local exchanges by employing the types of channels 114, 118, 122 discussed above.

Since local calls are handled by a single service provider, it has become customary for the service provider to charge a flat rate for unlimited local calls. A long-distance call, on the other hand, incurs cost based upon duration of the call and the distance between the receiving device and the calling device. The unit of measurement for call duration typically is minutes. Presently, in the United Stages, long-distance calls between any two points typically cost between 8 ¢/minute and 15 ¢/minute. In contrast, international calls cost on the order of dollars per minute. FIG. 2 more specifically describes how long-distance service providers are utilized to route long-distance calls.

Figure 2:
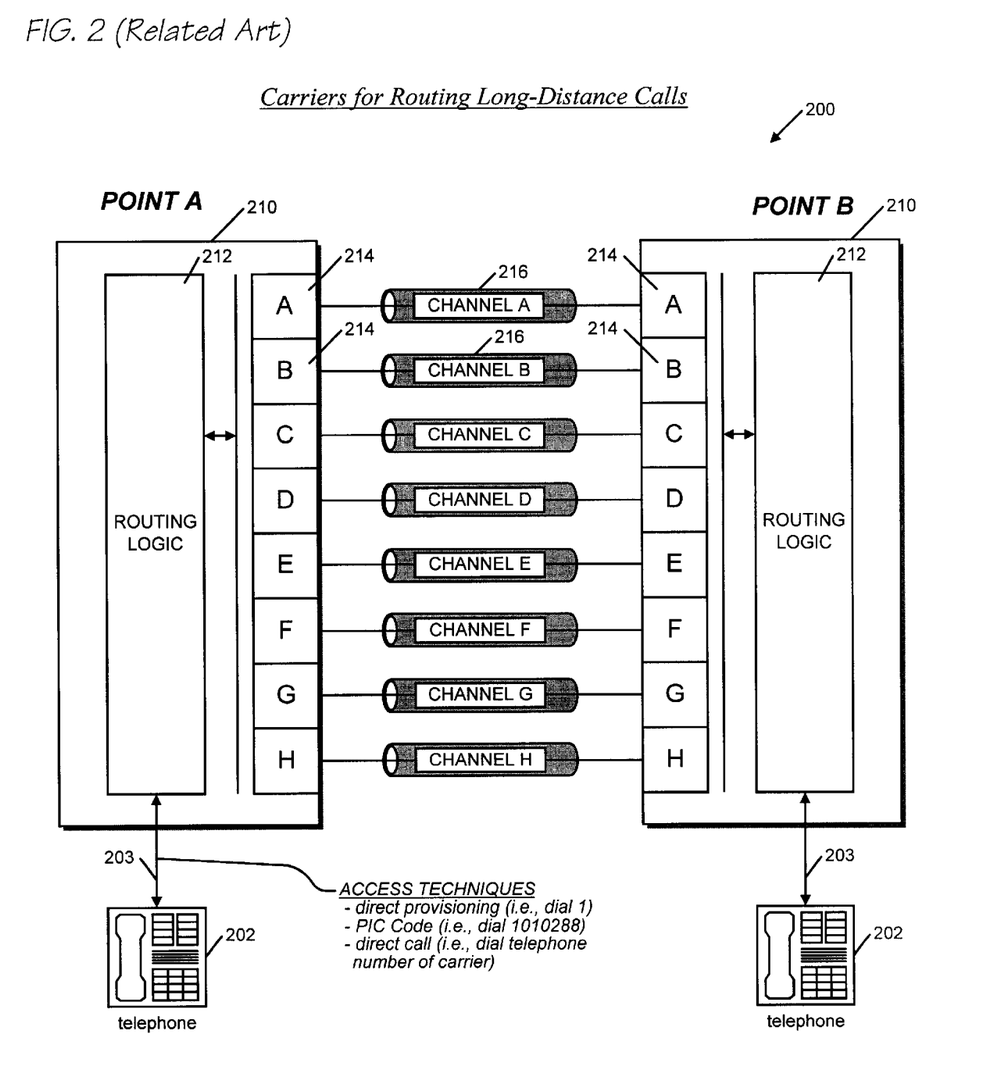
FIG. 2 is a block diagram illustrating how long-distance calls are routed via interexchange carrier channels within the related art telephony-centric network.

Referring to FIG. 2, a block diagram 200 is presented illustrating how long-distance calls are routed via interexchange carrier channels 216 within the related art telephony-centric network. The block diagram 200 shows two telephones 202 connected to two local switches 210, one at point A and another at point B. Each of the two local switches 210 contains routing logic 212. The two local switches 210 are connected by eight interexchange carrier channels 216, designated as CHANNEL A 216 through CHANNEL H 216. A specific carrier channel 216 may employ any or a combination of the channel media types 114, 118, 122 shown in FIG. 1 for transmission of telecommunications signals between the two local switches 210. For illustration purposes, assume that each of the carrier channels 216 is provided by a different interexchange service provider. Although only eight carrier channels 216 are shown in the block diagram 200, one skilled in the art will appreciate that there are hundreds of interexchange service providers competing for business within the market and that such competition is usually based upon a per-minute rate for calls. For simplicity, only eight interexchange carrier channels 216 are shown in the block diagram 200.

Operationally, when a caller from a telephone 202 or other telephony-centric network device 202 accesses a corresponding local switch 210, routing logic 212 within the local switch 210 monitors signaling commands on a corresponding incoming line 203, or circuit. The signaling commands typically indicate a telephone number that the caller enters from the telephone 202. If the signaling commands indicate that the caller desires to make a local call, then the local call is placed exclusively by equipment (not shown) provided by a local exchange carrier. However, if the signaling commands indicate that the caller desires to make a long-distance call, then the routing logic 212 must select a long-distance carrier channel 216 for transmission of the telecommunications signals from the local switch 210 at point A to the destination local switch 210 at point B.

At the moment, three techniques are employed by the routing logic 212 to select, or access, long-distance transmission logic 214 for routing of an interexchange call. A first technique, direct provisioning, is the default technique used by local exchange carriers. When signaling commands indicate that the caller initially enters a "1" over the circuit, then the routing logic 212 directs the long-distance call to transmission logic 214 that has been previously designated (i.e., provisioned) by the caller for long-distance calls. For example, if the caller has provisioned long-distance services for his/her circuit 203 to Company A, then each time the caller dials a long-distance number using the conventional method, the long-distance call will be routed to Company A's transmission logic 214. The transmission logic 214, in turn, will route the long-distance call over Company A's carrier channel 216 to a destination switch 210. At the destination switch 210, Company A's transmission logic 214 will provide the call to destination routing logic 212. The routing logic 212 in the destination local switch will route the call to the destination telephone 202. Accordingly, the local switches 210 will route long-distance calls for lines 203 that have directly provisioned long-distance calls to Company B through Company B's equipment 214, 216. The technique operates similarly for Company C through Company H. If a particular long-distance service provider does not have a carrier channel 216 or equipment 214 connected to a given local switch 210, then that service provider generally leases another service provider's assets 214, 216 to provide long-distance service at the switch 210.

A second technique, access code entry, is used by a caller to override direct provisioning during a calling session. Rather than initiating a long-distance call in the conventional manner, that is, by dialing 1 plus an area code plus a local telephone number, the caller will first enter a 7-digit number to access a specific long-distance service provider's equipment 214. This 7-digit number is known as a presubscribed interexchange carrier (PIC) code. When a PIC code corresponding to a specific long-distance carrier, say Company F, is entered, then the local switch 210 will route the ensuing long-distance call via Company F's equipment 214, 216, overriding any previous direct provisioning decisions that the caller may have made. Each long-distance carrier has a corresponding PIC code.

A third technique that allows a caller to access a specific long-haul carrier's equipment 214, 216 to place a long-distance call is simply dialing a telephone number provided by the specific long haul carrier. When the caller dials the telephone number, routing logic 212 routes the connection to the specific carrier's equipment 214, 216 for placement of the long-distance call.

Direct provisioning, access code (PIC code) entry, and direct call entry are the three principal techniques that are used to route interexchange calls to long-distance carriers. In previous years, the direct provisioning technique prevailed in use. However, due to intense competition in more recent years for long-distance services, use of the two latter techniques by consumers has increased. In particular, callers now are using the two overriding techniques to take advantage of long-distance savings according to time of day. For example, a caller may use Company A's services during the morning hours, Company B's services during the afternoon hours, and Company D's services during the evening hours. In fact, large-volume consumers utilize specialized equipment (not shown) to automatically enter selected PIC codes or direct access numbers during certain times of the day. For this reason, callers in a large business may not even be aware of which long-distance carrier is being employed to place his/her call.

In recent years competition in the long-distance carrier market has resulted in long-distance service being considered as a commodity item by consumers. Quality of service is no longer an important criteria that a consumer considers when choosing a long-distance service provider. The most important consideration now is price. In addition to selecting a carrier based principally on price, another cultural change has taken place in the marketplace as a result of the affordability of long-distance services: consumers are now utilizing the telephone to relay simple messages rather than the written word. In less recent times, simple messages were drafted and mailed to a recipient. But now written messages are becoming less common; and use of the telephone to pass short messages is becoming more widespread.

Especially in particular business areas, the integration of desktop computer application programs with automatic dialers has resulted in entire departments whose job description consists exclusively of placing calls to customers or suppliers. Examples of such business areas include direct marketing, catalog sales, and confirmation services. And most of the messages that are provided by such businesses do not require an immediate response from a call recipient. The message passed during the short call is simply to inform the call recipient of a recent fact. For instance, a business selling articles of clothing exclusively through catalog sales will be compelled to notify customers when items related to a particular order are not available for shipment by a promised ship date. This scenario is more specifically described with reference to FIG. 3.

Figure 3:
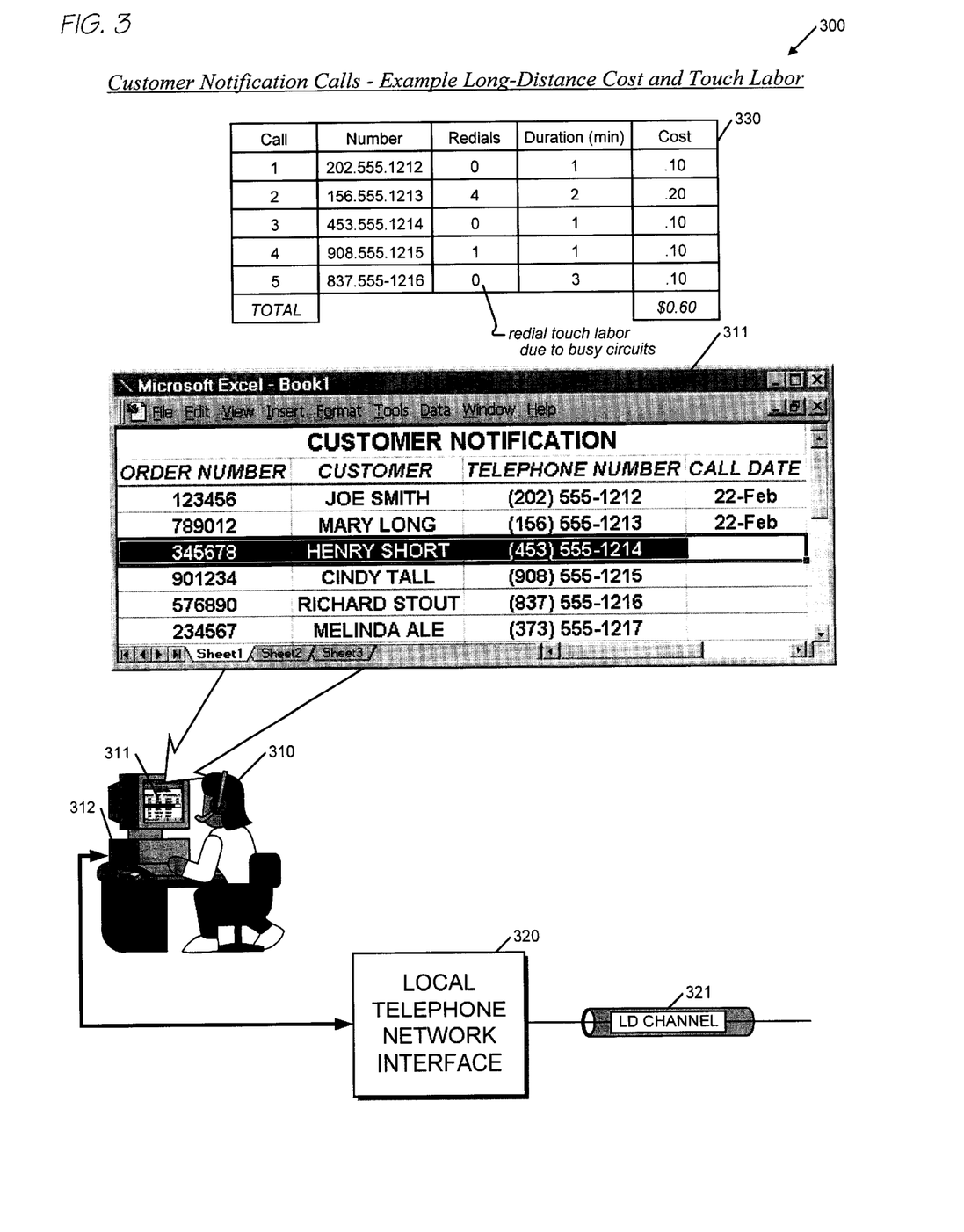
FIG. 3 is a diagram exemplifying the long-distance cost and touch labor required to place a number of customer notification calls.

Referring to FIG. 3, a block diagram 300 is presented illustrating the long-distance cost and touch labor required to place a number of customer notification calls. The block diagram 300 depicts a customer service operator 310 viewing a computer display 311 having a list of customers to be notified. The computer display is provided by an application program that utilizes a computer 312 to automatically dial the telephone number of a customer that the customer service operator 310 selects. For long-distance notification calls, each time the customer service operator 310 selects a customer from the list on the computer display 311, the computer 312 accesses a long-distance carrier 321 through a local switch 320 by either of the three aforementioned access methods. Because the application program is designed to automate the dialing process for each call, the operator 310 does not have to physically dial each number; the computer 312 initiates each call. Furthermore, when a call is routed through the long-distance carrier 321 to a receiving device and a recipient answers, that is, when the long-distance call is completed, operator 310 is prompted by information on the computer display 311 so he/she 310 can relay a message.

The example shown in FIG. 3 is just one of many cases where an operator 310 is employed specifically for the purpose of relaying a number of messages by telephone. But although computer/telephone integration has allowed this kind of task to be easily accomplished, both the cost and efficiency of such an approach are questionable. First, as table 330 shows, not every call is completed on the first attempt. Sometimes call recipients are using the telephone at the time a notification call is placed. In this case, the operator 310 receives a busy signal. For example, for call number 2, four redial attempts were required to make the notification. Second, table 330 indicates that there is a tangible cost associated with making the five listed calls. One skilled in the art will appreciate that any given operator 310 makes hundreds of calls each day, thus increasing the cost shown in the table 330 by two orders of magnitude. And there are intangible costs associated with live notification calls. The efficiency of the operator 310 is decreased each time a busy signal is received. In addition, the amount of time incurred simply waiting through some number of rings for a recipient to answer the telephone is significant when viewed from the perspective of hundreds of calls. Finally, although table 330 shows costs that are more in line with rates for calls within the United States, one skilled in the art will appreciate that if the calls are to international recipients, then the cost shown in the table would increase up to tenfold.

The examples of FIGS. 1 through 3 illustrate that there is a problem associated with utilizing present day long-distance carriers for the purpose of making notification calls, i.e., calls where no immediate response from a recipient is required. Costs are incurred each time a call is placed because the corresponding long-distance carrier 321 must be accessed in order to contact the recipient. And operator efficiency is decreased under the present notification approach because time is wasted redialing busy numbers and waiting for recipients to answer.

The present invention overcomes the cost and efficiency limitations sustained when long-distance telephone calls are employed for notification purposes. The present invention provides a mechanism to locally intercept a long-distance call, thereby giving a caller the opportunity to send a voicemail message rather than completing the long-distance call. The voicemail message is subsequently sent over a data-centric network rather than the telephony-centric network and is automatically delivered to a recipient, thereby providing increased efficiency and cost savings for the caller. The present invention is more completely described with reference to FIGS. 4 through 7.

Figure 4:
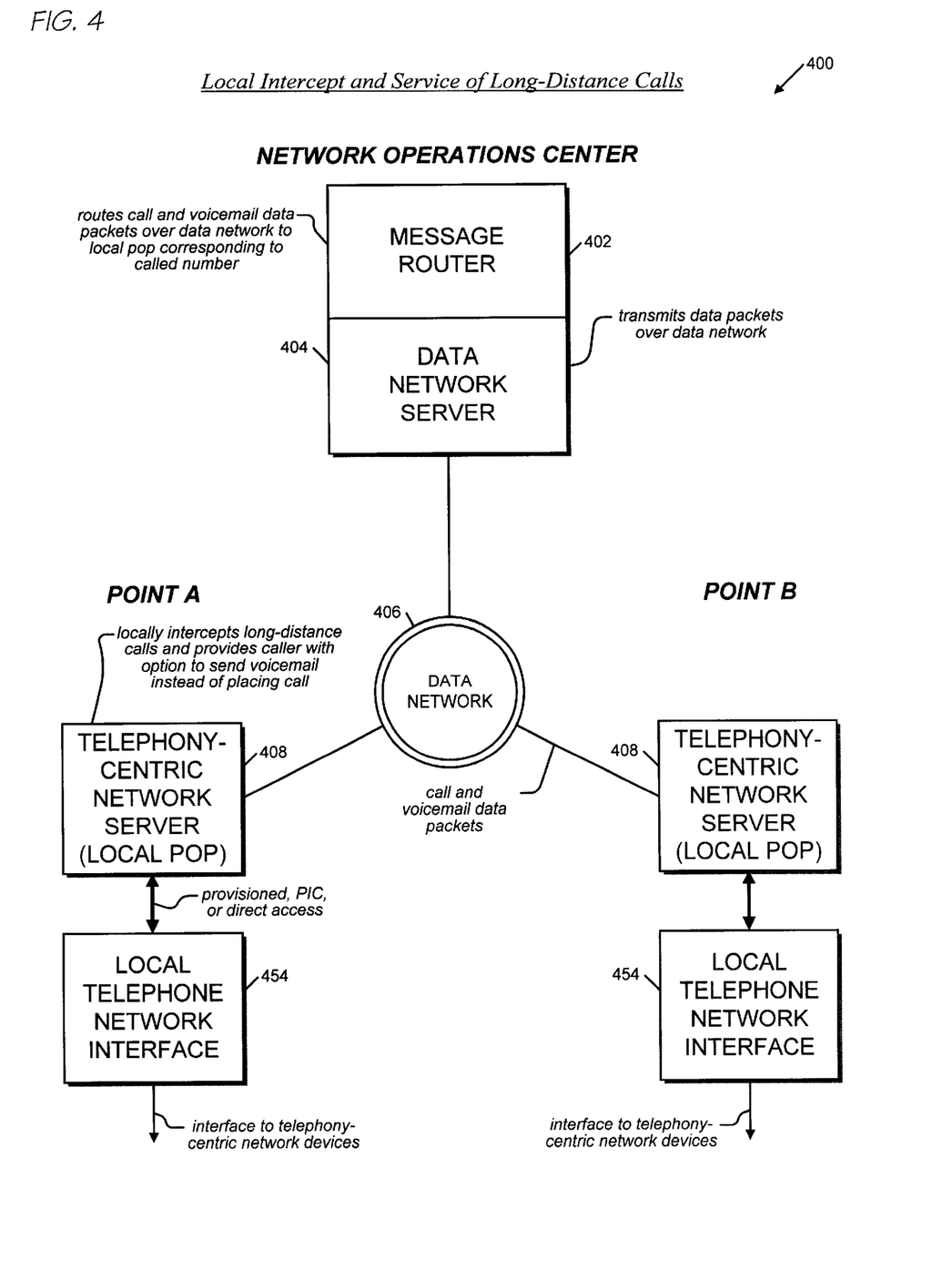
FIG. 4 is a block diagram illustrating an apparatus according to the present invention for locally intercepting and servicing a long-distance call.

Now referring to FIG. 4, a block diagram 400 is presented illustrating an apparatus according to the present invention for locally intercepting and servicing a long-distance call. The block diagram 400 includes a message router 402 that is coupled to a data network server 404. Both the message router 402 and the data network server 404 are located at a network operations center. The data network server 404 is connected to a data-centric network 406. In contrast to the telephony-centric network, or public-switched telephone network (PSTN), which is optimized for real-time voice communication, the data-centric network 406 is specifically designed for the reliable and efficient transmission of data packets, i.e., portions of an electronic message that contain a destination address and a sequence number. Routers and servers direct data packets over the data-centric network 406 to their destination address where the sequence number is used to reassemble the electric message. In one embodiment, the data-centric network 406 is the Internet, also known as the World Wide Web. In an alternative embodiment, the data-centric network 406 is a private packet-switched network. The block diagram 400 also includes telephony-centric network servers 408 that interface to the data-centric network 406 and that communicate with corresponding local telephone network interfaces 454, or local switches 454.

The data-centric network 406 is a network that carries digital data, primarily to facilitate information exchange among computers and computer peripherals. Initially, data-centric networks 406 were used chiefly for non-real-time applications such as electronic file transfer. However, in more recent years, data transfer technologies have improved to the extent that data-centric networks 406 are now being used to transfer real-time data such as audio and video. Transport control protocol/internet protocol (TCP/IP) is the protocol most often employed to transfer data over the internet. Accordingly, long-distance services provided over a data-centric network 406 are sometimes known as IP telephony services.

Operationally, telecommunication services are provided according to the present invention by collocating telephony-centric network servers 408 with corresponding local telephone network interfaces 454, very much in architecture like the long-distance carrier equipment 214 depicted in FIG. 2. The difference between conventional carrier equipment 214, 216 and data-centric carrier equipment 402, 404, 406, 408 according to the present invention lies in the fact that the data-centric network 406 is used as a transmission medium rather than conventional telephony-centric network channels 456. Access to the telephony-centric network server 408 is obtained, however, in the very same manner that a caller obtains access to conventional long-distance carrier equipment: either via direct provisioning, or by entry of a PIC code, or by direct dialing of a corresponding access number, or as a result of a long-distance-free call being routed. Henceforth, the ensuing discussion assumes that access to the telephony-centric network server 408 has been obtained by one of the four aforementioned access methods.

When a caller originates a conventional long-distance call from an originating device (not shown) at POINT A, the local switch 454 routes the call to the telephony-centric network server 408. The telephony-centric network server 408, or local point of presence (POP) 408 converts electrical signals that are modulated for communication over the telephony-centric network into data packets for communication over the data-centric network 406. The data packets are then sent by the local POP 408 over the data-centric network 406 to the data network server 402 in the Network Operations Center. The data network server 402 receives the data packets transmitted over the data-centric network 406 and routes them to a destination local POP 408 at POINT B using a route provided by the message router 402. Thus the data network server 404 and message router 402 provide network packet transmission and routing for conventional long-distance calls over the data-centric network 406. Local POPs 408 at call destinations convert the data packets back into signals compatible with the telephony-centric network and provide these signals to corresponding local switches 454 for delivery of calls to recipients.

A local POP 408 according to the present invention additionally provides the capability to intercept and service long-distance calls prior to completing them. Rather than immediately routing a long-distance call over the data-centric network channel 406, logic within the local POP 408 services the call. In one embodiment, the local POP 408 plays an audio message that allows the caller to select either to complete the long-distance call or to send a voicemail to a recipient in lieu of completing the call. In an alternative embodiment, the local POP 408 plays an audio faux ringback to the caller prior to playing the audio message prompting selection. In response, the caller indicates his/her selection. In one embodiment, the caller presses keys on his/her telephone to indicate selection. In an alternative embodiment, the caller uses voice commands to indicate selection. If the caller selects to complete the call, then the call is routed over the data-centric network 406 to a destination local POP 408 as described above. However, if the caller selects to send a voicemail in lieu of placing the call, then logic within the origination local POP 408 records the voicemail message and converts it into an electronic file suited for data packet transmission. In one embodiment, the electric file is .vox file format. The electronic file is stored locally within the local POP 408. Once the voicemail message is recorded, the local POP 408 terminates the connection with the caller, thereby saving long-distance costs that would otherwise be incurred has he/she selected to complete the call. The voicemail message is subsequently transmitted over the data-centric network 406, via a route provided by the message router 402, to a receiving local POP 408.

Once the voicemail message is received, logic within the destination local POP 408 converts the voicemail message data packets back into electrical signals compatible with the telephony-centric network. The destination local POP 408 then initiates a call to a receiving device through a corresponding destination local switch 454. Upon successful completion of the call, the local POP 408 delivers the voicemail message to the receiving device.

Figure 5:
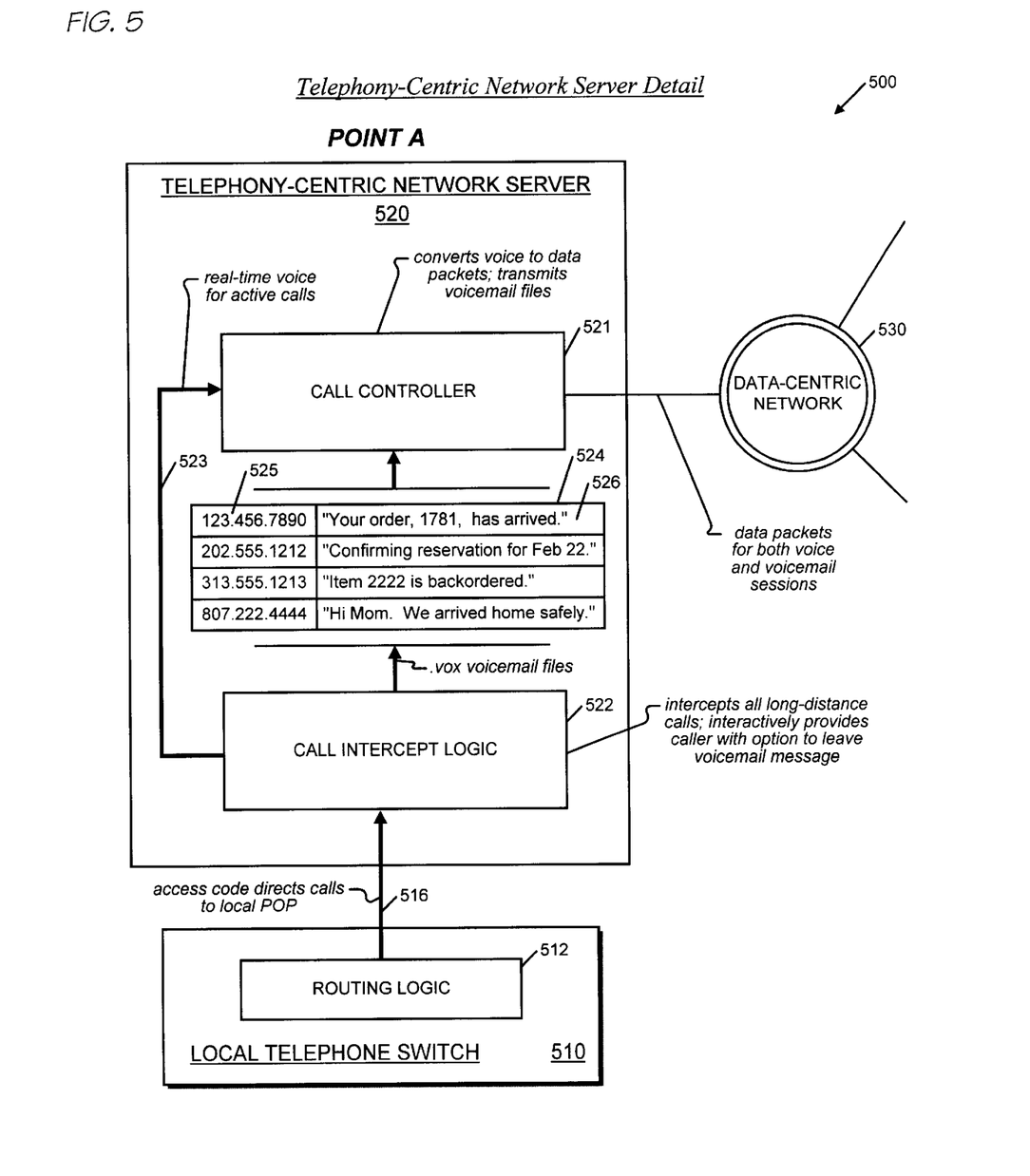
FIG. 5 is a block diagram illustrating details of a local telephony-centric network server according to the present invention.

Now referring to FIG. 5, a block diagram 500 is presented illustrating details of a local telephony-centric network server 520 according to the present invention. The block diagram 500 shows a local POP 520 at POINT A, an origination point for a long-distance call, connected to a data-centric network 530 according to the present invention. The local POP is also coupled to a local switch 510. The local switch 510 includes routing logic 512 that provides long-distance call requests to the local POP 520 via bus 516. The local POP 520 includes call intercept logic 522, a voicemail storage array 524, and a call controller 521.

Operationally, intercept and service of a long-distance call is obtained when a caller has already accessed the local POP 520-through either direct provisioning, PIC code entry, or by dialing a direct access number-and the caller subsequently dials a long-distance telephone number. The call intercept logic 522, upon receiving signaling commands from an originating telephone, will play the audio message prompting the caller to select either voicemail or call completion. If the caller selects to complete the call, then the number dialed by the caller is patched through to the call controller 521 via bus 523. The call controller 521 subsequently completes the long-distance call via the data-centric network 530. The call controller accomplishes real-time translation of the call audio signals to data packets and transmits the packets over the data-centric network 530. If the caller selects to send a voicemail instead of completing the long-distance call, then the call intercept logic 522 prompts the caller to record his/her message. Audio from the caller is recorded by the call intercept logic 522 for a fixed maximum time period. In one embodiment, the fixed maximum time period is 60 seconds. Recording is also terminated by a period of silence or by termination of the call by the caller. In one embodiment, the period of silence is five seconds.

The call intercept logic 522 translates the recorded voicemail audio to a format compatible with storage and packet transmission and stores the voicemail message file in a voicemail element 526 in the voicemail storage array 524. In one embodiment, the voicemail audio is converted into .vox file format for storage in the array 524. In addition, the call intercept logic 522 stores a telephone number for the voice mail message in a corresponding number element 525 in the voicemail storage array 524.

Once the message is recorded, the call intercept logic 522 plays an audio message for the caller indicating that the message is to be delivered and that the call is to be terminated. The call intercept logic 522 then terminates the connection with the caller.

In one embodiment, the call controller periodically scans the voicemail storage array 524 and forwards all voicemail entries to the message router (not shown) via the data-centric network 530. The message router then forwards the voicemail entries to local POPs corresponding to each entry's destination.

When long-distance calls are intercepted and serviced locally by a local POP 520 according to the present invention, a caller does not incur any long-distance carrier charges. Only when the caller selects to complete the call do charges accrue. Three benefits arise when a business that performs many notifications via the telephone utilizes the present invention. First, regardless of the number of voicemails issued, the business does not incur long-distance carrier charges. Second, because local POPs automatically initiate calls to deliver voicemail messages, operators and attendants at the business are free to perform other tasks rather than waiting for a line to become free. Third, the present invention provides for more efficient use of telephone resources within the business: outgoing lines are not tied up as much as they would be otherwise. More notification calls can be placed within a given time period.

Figure 6:
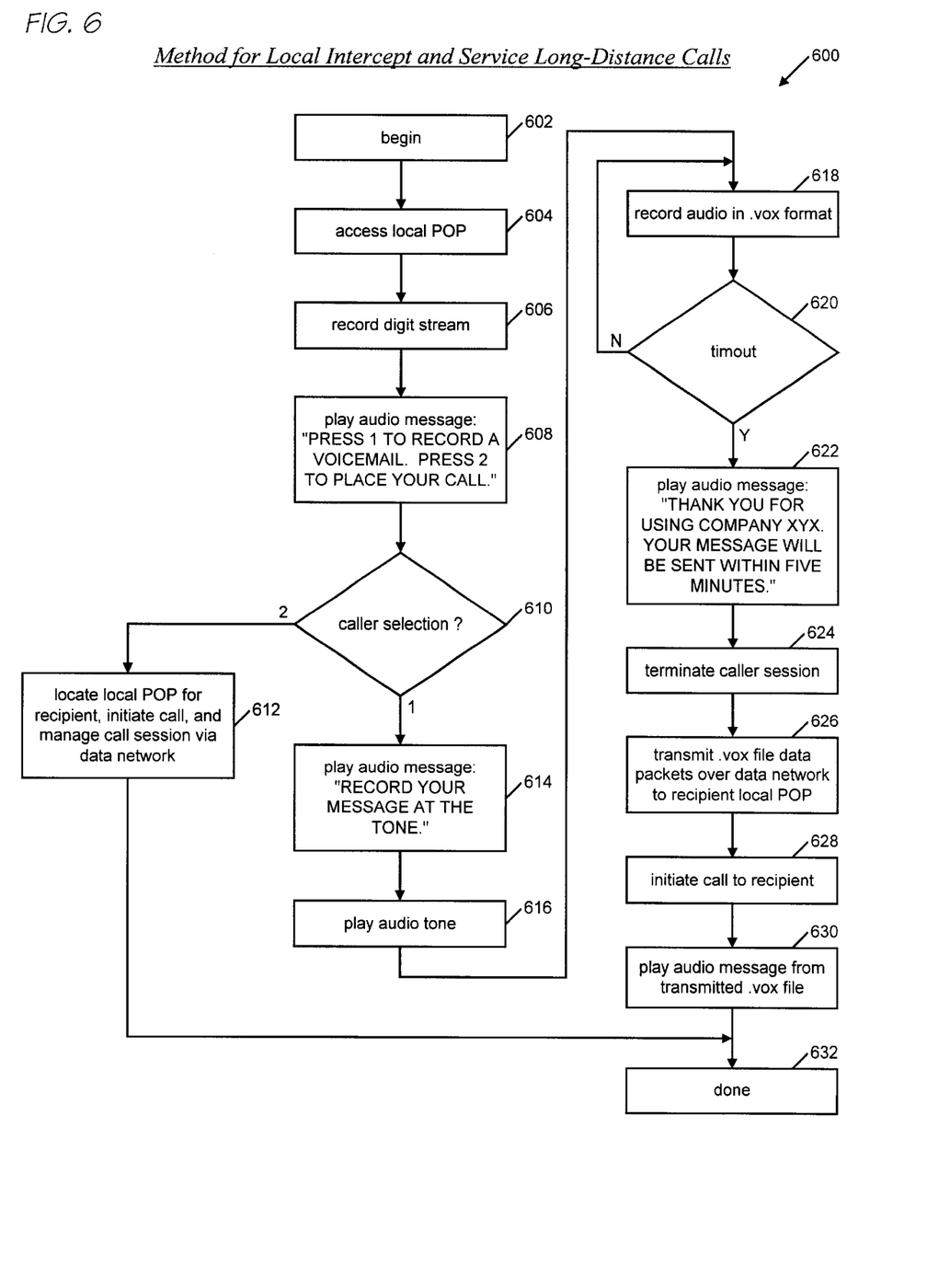
FIG. 6 is a flow chart illustrating a method according to the present invention for locally intercepting and servicing a long-distance call.

Now referring to FIG. 6, a flow chart 600 is presented illustrating a method according to the present invention for locally intercepting and servicing a long-distance call.

Flow begins at block 602, where a caller causes an origination device to issue a long-distance call. Flow then proceeds to block 604.

At block 604, the call is routed by the local telephone network exchange to a local telephony-centric network server according to the present invention. The call is routed to the local telephone network server because 1) a carrier channel corresponding to the present invention has been prescribed through direct provisioning, 2) PIC code corresponding to the carrier channel has been prescribed by the caller, or 3) the caller has directly dialed a telephone number to access to the local telephony-centric network server. Flow then proceeds to decision block 606.

At decision block 606, as the caller enters a telephone number designating a receiving device for the long-distance call, logic within the local POP records the digits entered for either storage in the voicemail storage array or for completing the call. Flow then proceeds to block 608.

At block 608, the local POP plays an audio message prompting the caller to select either to transmit a voicemail to the receiving device or to complete the long-distance call. Flow then proceeds to decision block 610.

At decision block 610, the callers response to the prompt is evaluated. If the caller selects to complete the long-distance call, then flow proceeds to block 612. If the caller chooses to send a voicemail in lieu of completing the long-distance call, the flow proceeds to block 614.

At block 612, since the caller has not selected the voicemail option, a message router according to the present invention locates a local POP corresponding to the receiving device, initiates a call session with the receiving device via a local switch, and proceeds to forward data packets containing audio content of the call via the data-centric network. Flow then proceeds to block 632.

At block 614, since the caller has selected to transmit a voicemail message, the local POP plays an audio message for the caller prompting entry of the voicemail message following presentation of an audio tone. Flow then proceeds to block 616.

At block 616, the local POP plays the audio tone for the caller. Flow then proceeds to block 618.

At block 618, the local POP records the voicemail message provided by the caller in .vox file format. Flow then proceeds to decision block 620.

At decision block 620, a timer within the local POP is evaluated to determine is a maximum recording period has elapsed. If not, then flow proceeds to block 618, wherein audio recording of the voicemail message is continued. If the maximum recording period has elapsed, then flow proceeds to block 622.

At block 622, the local POP plays an audio message for the caller indicating a successful message recording session. Flow then proceeds to block 624.

At block 624, the local POP automatically terminates the call session with the caller. Flow then proceeds to block 626.

At block 626, the data packets corresponding to the recorded voicemail message are transmitted over the data-centric network to a destination local POP. Flow then proceeds to block 628.

At block 628, the destination local POP initiates a call to the receiving device via a corresponding local telephone switch. Flow then proceeds to block 630.

At block 630, the voicemail message is delivered to the receiving device. Flow then proceeds to block 632.

At block 632, the method completes.

Figure 7:
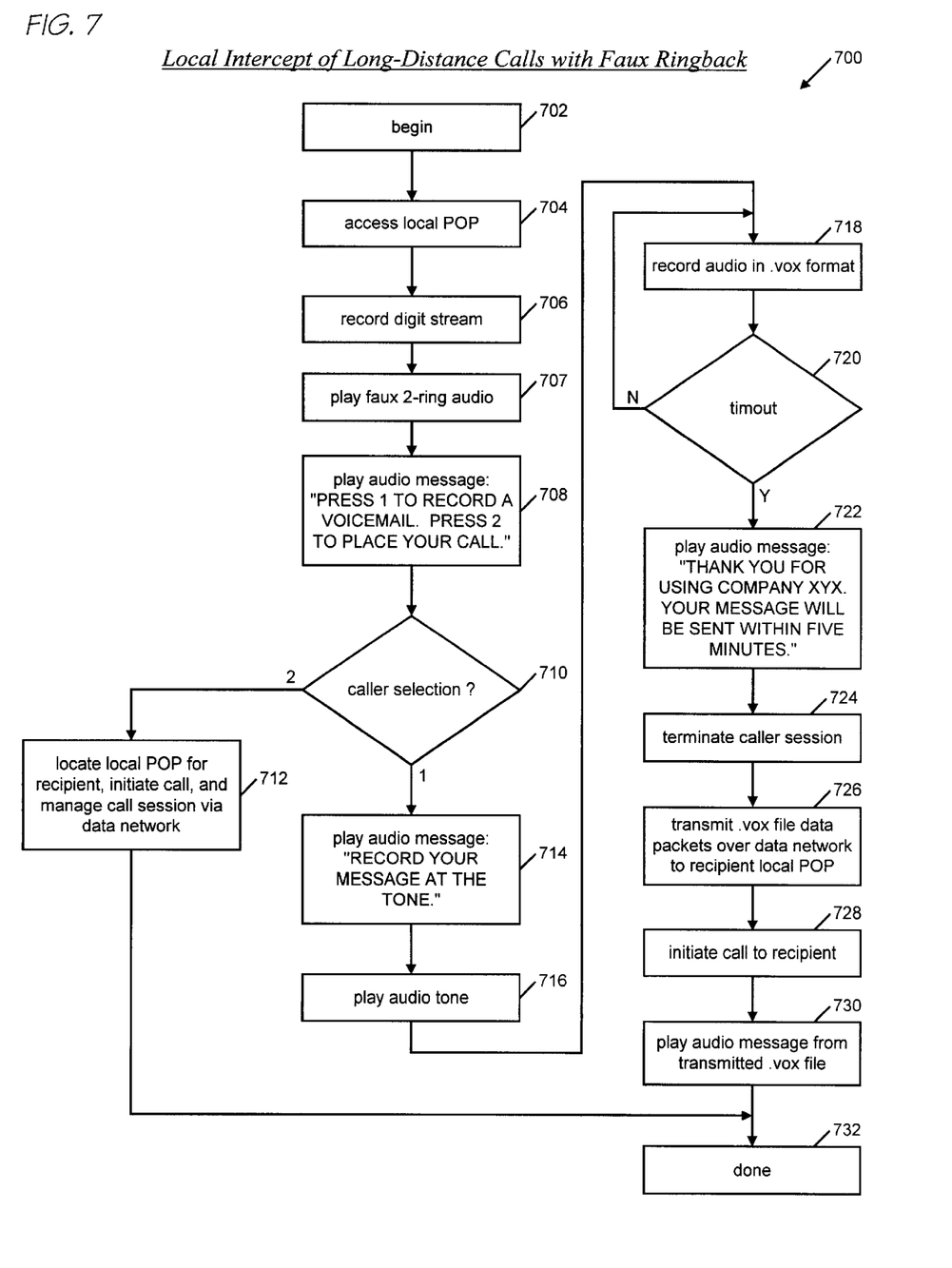
FIG. 7 is a flow chart illustrating a method according to the present invention for locally intercepting and servicing a long-distance call that provides a faux ringback for the calling party.

Now referring to FIG. 7, a flow chart 700 is presented illustrating an alternative method according to the present invention for locally intercepting and servicing a long-distance call. The alternative method provides a faux ringback for the calling party prior to playing an audio message announcing the option to send a voicemail rather than completing the call.

Flow of the blocks presented in FIG. 7 is like the blocks discussed with reference to FIG. 6, the hundreds digit being replaced with a 7. The only difference lies in the addition of block 707 between block 706 and block 708. Block 707 adds the faux ringback audio that is played for the caller prior to announcing the option for sending a voicmail.

Although the present invention and its objects, features, and advantages have been described in detail, other embodiments are encompassed by the invention. For example, the present invention has been particularly characterized by completion of long-distance calls over the Internet data-centric network. Although the Internet is widely used today for transmission of messages between communication devices, the present invention is not dependent upon such capability being provided. The data-centric network element according to the present invention can be embodied as a private network utilizing proprietary or leased communication channel assets.

In addition, the present invention has been characterized in terms the interception and service of calls to long-distance numbers that utilize real-time audio, i.e., voice, as a communication means. However, it is within the scope of the present invention to provide local intercept and service of other forms of communications such as facsimile or other electronic text forms. Utilizing the efficiency of a data-centric network for transfer of electronic information such as facsimile results is greater cost savings to a long-distance customer. In this case, a local POP may merely detect electronic signals (such as fax tones) from an originating device and automatically switch to voicemail message mode. Following this, the call is terminated the obtained data is transferred as a burst over the data-centric network.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method for locally intercepting a long-distance call, comprising:

a) accessing a first telephony-centric network server;

b) initiating the long-distance call;

c) prior to completing the long-distance call, allowing a caller to prescribe a voicemail message;

d) routing the voicemail message over a data network, the data network employing a packet-switched communications protocol, to a second telephony-centric network server that corresponds to a recipient of the long-distance call; and e) delivering the voicemail message to the recipient rather than completing the long-distance call.

2. The method as recited in claim 1, wherein said accessing comprises:

i) establishing a connection from an originating device through its corresponding local telephone switch to the telephony-centric network server.

3. The method as recited in claim 2, wherein said establishing is initiated automatically as a result of direct provisioning.

4. The method as recited in claim 2, wherein said establishing is initiated as a result of the caller providing a PIC code to the corresponding local telephone switch.

5. The method as recited in claim 2, wherein said establishing is initiated as a result of the caller dialing a telephone number.

6. The method as recited in claim 2, wherein the originating device is a telephone.

7. The method as recited in claim 2, wherein the originating device is a computer.

8. The method as recited in claim 2, wherein said allowing comprises:

i) playing an audio message that prompts the caller to select either to complete the long-distance call or to prescribe the voicemail message;

ii) if the caller selects to prescribe the voicemail message, recording the voicemail message;

iii) storing the voicemail message in the first telephony-centric network server for subsequent delivery; and iv) terminating the connection provided by said establishing.

9. The method as recited in claim 8, wherein said allowing further comprises:

v) prior to said playing, providing faux ringback audio to the caller.

10. The method as recited in claim 8, wherein the voicemail message is stored as a .vox file.

11. The method as recited in claim 10, wherein said routing comprises:

i) retrieving the voicemail message;

ii) converting the voicemail message into data packets that are compatible with the data network;

iii) transmitting the data packets over the data network to a data network server;

iv) within the data network server, selecting the second telephony-centric network server based upon a telephone number provided by said initiating; and v) forwarding the data packets to the second telephony-centric network server.

12. The method as recited in claim 11, wherein the data network is the internet.

13. The method as recited in claim 12, wherein said transmitting is accomplished using TCP/IP protocol.

14. The method as recited in claim 11, wherein said delivering comprises:

i) causing a local telephone switch to establish a connection with a receiving device, the receiving device corresponding with the recipient; and ii) playing the voicemail message over the established connection.

15. An apparatus for locally intercepting a long-distance call for the purpose of allowing a caller to prescribe a voicemail message rather than completing the long-distance call, the apparatus comprising:

a telephony-centric network server, configured to detect initiation of the long-distance call, to intercept the long-distance call prior to transmission over a telephony-centric network, and to transmit the voicemail message over a data-centric network, said data-centric network providing for packet-switched communications; and a message router, coupled to said telephony-centric network server, configured to forward the voicemail message over said data-centric network to a recipient, wherein the voicemail message is delivered to said recipient from a corresponding local telephone switch.

16. The apparatus as recited in claim 15, wherein said telephony-centric network server is accessed from an originating local switch by direct provisioning of an originating line.

17. The apparatus as recited in claim 15, wherein said telephony-centric network server is accessed from an originating local switch as a result of a caller entering a PIC code via an originating line.

18. The apparatus as recited in claim 15, wherein said telephony-centric network server is accessed from an originating local switch as a result of a caller dialing a telephone number to access said telephony-centric network server from an originating line.

19. The apparatus as recited in claim 15, wherein the long-distance call is originated from a telephone.

20. The apparatus as recited in claim 15, wherein the long-distance call is originated from a computer.

21. The apparatus as recited in claim 15, wherein said telephony-centric network server plays an audio message to prompt the caller to prescribe the voicemail message.

22. The apparatus as recited in claim 21, wherein said telephony-centric network server provides faux ringback audio to the caller prior to playing said audio message.

23. The apparatus as recited in claim 22, wherein said telephony-centric network server terminates a connection with the caller and translates the voicemail message into data packets for transmission over said data-centric network.

24. The apparatus as recited in claim 23, wherein said data-centric network is the internet.

25. A long-distance call interception apparatus, comprising:

a telephony-centric network server, for locally intercepting and servicing a long-distance call, said telephony-centric network sever comprising:

call intercept logic, for allowing a caller to prescribe a voicemail message in lieu of completing said long-distance call over a telephony-centric network; and a call controller, coupled to said call intercept logic, for translating said voicemail message into data packets, and for transmitting said data packets over a data-centric network rather than said telephony-centric network; and a message router, coupled to said telephony-centric network server, configured to receive said data packets and to route said data packets over said data-centric network such that a receiving local telephone switch is caused to deliver said voicemail message to a receiving device.

26. The long-distance call interception apparatus as recited in claim 25, wherein said telephony-centric network server is accessed from an originating local telephone switch by direct provisioning, by entry of a PIC code by said caller, or by said caller directly dialing a telephone number to access said telephony-centric network server.

27. The apparatus as recited in claim 26, wherein said call intercept logic plays an audio message to prompt said caller to prescribe said voicemail message.

28. The apparatus as recited in claim 27, wherein said call intercept logic provides faux ringback audio to said caller prior to playing said audio message.

29. An apparatus for locally servicing a long-distance call, the long-distance call being initiated from a calling device that has accessed a telephony-centric network server, comprising:

call intercept logic, for allowing a caller to generate a voicemail message over the calling device for delivery to a receiving device, wherein said voicemail message is generated and delivered instead of completing the long-distance call over a telephony-centric network;

voicemail storage elements, coupled to said call intercept logic, for temporarily storing said voicemail message along with a telephone number corresponding to said receiving device;

a call controller, coupled to said voicemail storage elements, for retrieving said voicemail message and for translating said voicemail message into data packets; and a data-centric network, coupled to said call controller, for transmitting said data packets such that said voicemail message is delivered to said receiving device by a local telephone switch, wherein said data-centric network provides for packet-switched communications, and wherein said data-centric network is employed in lieu of said telephony-centric network for delivery of said voicemail message.

30. The apparatus as recited in claim 29, wherein said data-centric network is the internet.

31. The apparatus as recited in claim 30, wherein said voicemail storage elements comprise memory within a computer.

32. The apparatus as recited in claim 31, wherein said call controller and said call intercept logic comprise a software application program in a computer.

* * * * *

UNITED STATES PATENT AND TRADEMARK OFFICE
CERTIFICATE OF CORRECTION

PATENT NO.    : 6,243,444 B1
DATED         : June 5, 2001
INVENTOR(S)   : Stephen C. O'Neal It is certified that error appears in the above-identified patent and that said Letters Patent is hereby corrected as shown below:

Column 4,
Line 19, "sever" should read -- server --.

Column 7,
Line 21, "United Stages" should read -- United States --.

Column 16, claim 25,
Line 51, "sever" should read -- server --.

Signed and Sealed this

Fifteenth Day of January, 2002

Attest:

Attesting Officer

JAMES E. ROGAN
*Director of the United States Patent and Trademark Office*